(12) United States Patent
Marquess et al.

(10) Patent No.: US 9,483,579 B2
(45) Date of Patent: Nov. 1, 2016

(54) METHOD, SYSTEM AND COMPUTER PROGRAM FOR ADDING CONTENT TO A DATA CONTAINER

(71) Applicant: Openwave Mobility Inc., Redwood City, CA (US)

(72) Inventors: Paul Marquess, Belfast (GB); Aaron David Irvine, Antrim (GB)

(73) Assignee: Openwave Mobility Inc., Redwood City, CA (US)

( * ) Notice: Subject to any disclaimer, the term of this patent is extended or adjusted under 35 U.S.C. 154(b) by 208 days.

(21) Appl. No.: 14/250,218

(22) Filed: Apr. 10, 2014

(65) Prior Publication Data

US 2014/0310292 A1    Oct. 16, 2014

(30) Foreign Application Priority Data

Apr. 10, 2013 (GB) .................................. 1306531.3

(51) Int. Cl.

| H04N 21/00 | (2011.01) |
|---|---|
| G06F 17/30 | (2006.01) |
| H04L 29/06 | (2006.01) |
| H04N 21/234 | (2011.01) |
| H04N 21/845 | (2011.01) |

(52) U.S. Cl.
CPC ......... *G06F 17/30943* (2013.01); *H04L 69/04* (2013.01); *H04L 69/22* (2013.01); *H04N 21/23424* (2013.01); *H04N 21/8456* (2013.01)

(58) Field of Classification Search
CPC .................. G06F 17/30946; H04N 21/23424
See application file for complete search history.

(56) References Cited

U.S. PATENT DOCUMENTS

| 7,096,488 B1 | 8/2006 | Zhang et al. |
| 7,949,052 B1 | 5/2011 | Wu et al. |
| 2004/0229650 A1* | 11/2004 | Fitton .................. H04B 7/0811 455/561 |
| 2006/0047523 A1 | 3/2006 | Ojanpera |
| 2007/0040934 A1* | 2/2007 | Ramaswamy ....... H04N 21/235 348/385.1 |
| 2007/0091810 A1* | 4/2007 | Kim ..................... H04L 1/1635 370/236 |

(Continued)

FOREIGN PATENT DOCUMENTS

| EP | 0684570 A1 | 11/1995 |
| WO | 2005-099385 A2 | 10/2005 |
| WO | 2011100758 A1 | 8/2011 |

OTHER PUBLICATIONS

European Search Report issued in related case EP 14164180.3 dated Jun. 12, 2014 (8 pages).

(Continued)

*Primary Examiner* — Grace Park
(74) *Attorney, Agent, or Firm* — EIP US LLP

(57) ABSTRACT

There is described a system for adding content to a data container, the data container comprising one or more segments arranged in a sequence, each segment containing payload data and wherein at least one of the one or more segments is compressed. The system comprises parsing through at least a portion of the data container so as to determine at least one of a beginning and an end of the sequence of segments; and adding content to the data container at the at least one of the beginning and the end of the sequence of segments, while the at least one of the segments remains compressed.

12 Claims, 8 Drawing Sheets

(56) References Cited

U.S. PATENT DOCUMENTS

| | | |
|---|---|---|
| 2007/0139704 A1 | 6/2007 | Ogura |
| 2009/0003432 A1 | 1/2009 | Liu et al. |
| 2009/0287784 A1 | 11/2009 | Haruna |
| 2010/0113074 A1 | 5/2010 | Sheppard |
| 2010/0161825 A1* | 6/2010 | Ronca .............. H04N 21/23424 709/231 |
| 2010/0223519 A1* | 9/2010 | Swoboda ......... G01R 31/31705 714/733 |
| 2011/0185077 A1* | 7/2011 | Bremler-Barr ...... H03M 7/3086 709/231 |
| 2011/0317547 A1 | 12/2011 | Baudoin et al. |
| 2012/0137015 A1* | 5/2012 | Sun .................. H04N 21/26258 709/231 |

OTHER PUBLICATIONS

Popa et al., "CryptDB: Protecting Confidentiality with Encrypted Query Processing", SOSP '11, Oct. 23-26, 2011, Cascais, Portugal.
GnuPG "How to edit the file without decrypt and save to local disk first?"; http://stackoverflow.com/questions/1510105/gnupg-how-to-edit-the-file-without-decrypt-and-save-to-local-disk-first; Oct. 2, 2009.

* cited by examiner

METHOD, SYSTEM AND COMPUTER PROGRAM FOR ADDING CONTENT TO A DATA CONTAINER

CROSS-REFERENCE TO RELATED APPLICATIONS

This application claims priority under 35 U.S.C. §119(a) to GB Patent Application No. 1306531.3, filed on Apr. 10, 2013, the entire content of which is hereby incorporated by reference.

BACKGROUND OF THE INVENTION

1. Field of the Invention

The present application relates to a method, system and computer program for adding data to a data container.

2. Description of the Related Technology

It is often desirable to add data to an already existing data container. For example, it is often desirable in a communications network to intercept a message between two communicating entities and add data to a data container in the message. For example, a user equipment in the communications network may request media content from a content provider. A server can intercept the request for media content, forward it onto the content provider, intercept the response from the content provider and add data to the response before sending the response onto the user equipment.

Such alteration could, for example, be used for advertising purposes. A user may load a web page using a web browser and the browser may send a Hypertext Transfer Protocol (HTTP) request message to an origin server (i.e. a content provider) in order to retrieve specified content. An advertising server may intercept such a message and forward it onto the origin server. The advertising server may intercept a corresponding HTTP response message and modifies the HTTP response message to include an advertisement. The loaded web page in the user's web browser may then display the advertisement.

Typically, a HTTP response is compressed with a specified content-encoding in order to reduce the size (i.e. reduce the number of bytes) of the HTTP response. This can be useful in general to reduce congestion in the network. Some of the most commonly used content encoding techniques for compression are the "gzip" (GNU-zip) encoding and the "deflate" encoding as defined in the RFC (Request For Comments) 2616 standards document. A content encoding of gzip comprises a data stream compressed in accordance with RFC (Requests for Comments) 1951 embedded in a container in accordance with RFC 1952. A content encoding of 'deflate' comprises a data stream compressed in accordance with RFC 1951 but embedded in a container in accordance with RFC 1950.

When modifying a HTTP response having a payload with a specified content-encoding so as to include additional data, the payload must first be decompressed, the additional data added to the data of the decompressed payload and the modified response (i.e. having the data as well as the additional data) is then recompressed before being transmitted to its destination. In general, this procedure is necessary because simply pre-pending or appending the additional data to the received HTTP response would produce a data container that is non-compliant with the content encoding technique used to encode the original payload. Such decompression and recompression consumes processing power, memory and adds latency to the network signaling. The decompression and recompression can also cause "bloating" of the HTTP response where the recompression is not as effective as the original compression and thus the delivered content (i.e. the modified HTTP response) is larger than the original HTTP response. Such bloating also adds latency and congestion in the communications network.

SUMMARY

In a first embodiment of the application, there is a system for adding content to a data container, the data container comprising one or more segments arranged in a sequence, each segment containing payload data and wherein at least one of the one or more segments is compressed, the system comprising at least one processor; and at least one memory including computer program code; the at least one memory and the computer program code may be configured to, with the at least one processor, cause the system to at least: parse through at least a portion of the data container so as to determine at least one of a beginning and an end of the sequence of segments; and add content to the data container at the at least one of the beginning and the end of the sequence of segments, while the at least one of the segments remains compressed.

Therefore, parsing the data container to determine at least one of the beginning and the end of the sequence of segments allows content to be added to the data container without requiring a full decompression of the data container. This reduces the amount of processing required when adding content to a data container (as the entire payload contained in the data container need not be fully decompressed before any data is added) and reduces memory usage.

In a second embodiment of the application, there is a method for adding content to a data container, the data container may comprise one or more segments arranged in a sequence, each segment containing payload data and wherein at least one of the one or more segments is compressed, the method may comprise parsing through at least a portion of the data container so as to determine at least one of a beginning and an end of the sequence of segments; and adding content to the data container at the at least one of the beginning and the end of the sequence of segments, while the at least one of the segments remains compressed.

In a third embodiment of the application, there is a non-transitory computer-readable storage medium having computer-executable instructions stored thereon, which, when executed by a processor cause a computing device to perform a method for adding content to a data container, the method comprising: parsing through at least a portion of the data container so as to determine at least one of a beginning and an end of the sequence of segments; and adding content to the data container at the at least one of the beginning and the end of the sequence of segments, while the at least one of the segments remains compressed.

Further features and advantages of the application will become apparent from the following description of embodiments of the application, given by way of example only, which is made with reference to the accompanying drawings.

DETAILED DESCRIPTION OF CERTAIN INVENTIVE EMBODIMENTS

Figure 1:
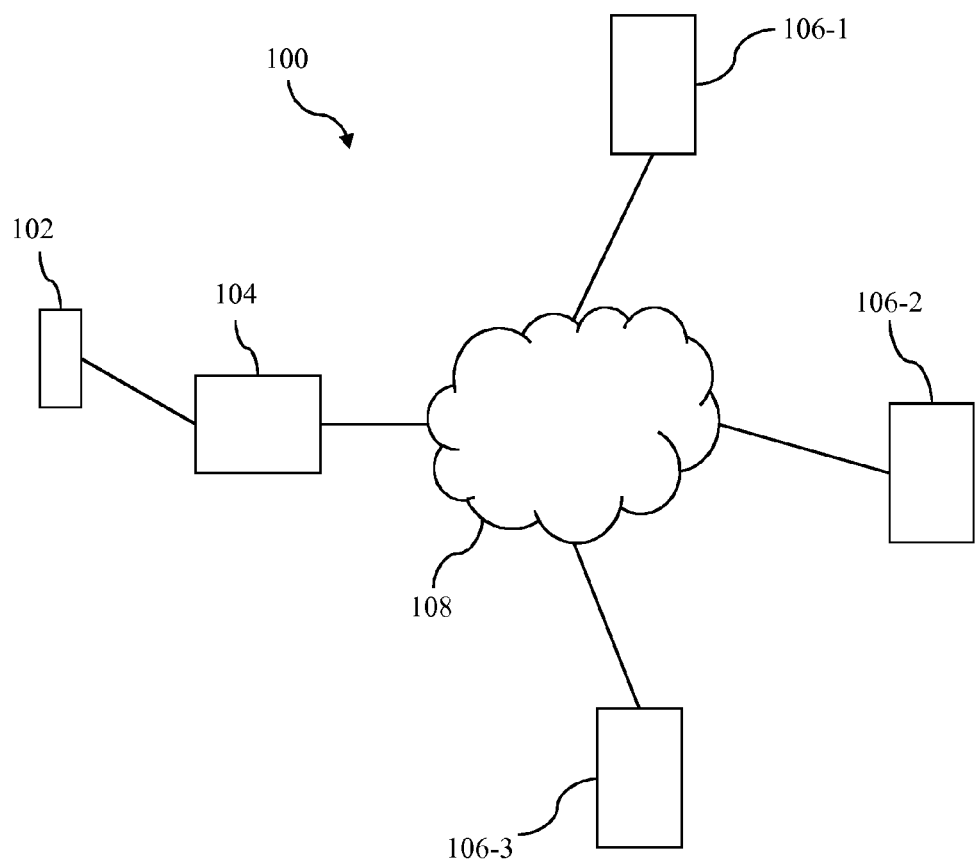
FIG. 1 is a schematic block diagram showing an example of a communications network.

In the following description of embodiments it should be noted that the term "user equipment" (UE) includes apparatus that are both wireless devices and wired devices. In general, wireless devices include any device capable of connecting wirelessly to a network. This includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The UE includes a "user agent" that comprises a software application that communicates with a network such as the Internet. Examples of 'user agents' include browsers (e.g. Internet Explorer®, Mozilla Firefox®, Google Chrome®, and so forth) that act as a user interface to communicate with the Internet, e-mail user agents, and apps. The user agent may use any suitable protocol as its transport or communications mechanism. For example, the user agent may use the Hypertext Transfer Protocol (HTTP).

Embodiments of the present invention relate to adding content to data containers having a particular content-encoding format. For example, the data container may form a part of an HTTP response. Therefore, such a HTTP response may comprise HTTP headers, the data container, and HTTP trailer data. The data container itself may also comprise header and trailer data, depending on the format specified by the content-encoding that is applied to the data container.

The term "encoding" generally refers to the process of configuring a file in a format for execution such as by execution by a web browser (i.e. a software application) of a user device. This term therefore can broadly encompass techniques such as transcoding, transrating, optimization and compression depending on the context in which the term is used. In the examples discussed herein, an encoded or compressed file or payload is one in which the original file size has been reduced and thus may also refer to a transcoded, transrated, optimized and/or compressed file. In any case, the file is referred to as being encoded due to having a particular content-encoding such as having one of the following content-encoding file formats: gzip (Gnu Zip), deflate, zip, bzip, bzip2, snappy file framing and lzip. It will be understood that this list is non-exhaustive and that other content-encodings will be applicable in the context to which the invention can be applied.

Particular content-encodings have arrangements of segments, which form at least part of the data container. For example, in particular examples discussed herein, the segments are referred to as "blocks" or "chunks". However, the term "segment" as used herein is intended to cover any such division, portion or sub-section of data of the data container.

The term "splice" as used herein means "to join together" and refers to the joining of new data with existing data in a manner such that they can be concatenated together.

Throughout this specification, there is discussed a "parsing", "traversal", or "walking" of a data structure such as a data container having an identified file format, content-encoding or other such known internal structure of data formatting. In the context of the invention, such terms refer to the process of reading and identifying specific points in a file format corresponding starting points or end points of data that has been characterized by the file format. Therefore, for example, the file format can be traversed so that different characterized portions of the file are identified.

The term "decompress" or "un-compress" as used herein refers to the general process required to restore compressed or encoded content to its original form, or as close as possible to its original form. Such decompression is typically dependent on the compression or encoding format used to compress the original content, which in some cases may be "lossless" (i.e. no loss of information during the compression) or "lossy" (i.e. where data may be lost during the compression).

FIG. 1 shows schematically a simplified example of a communications network 100, which may typically comprise, for example, an Internet Protocol Multimedia System (IMS) architecture. The network comprises a plurality of network elements 102, 104, 106, 108. In particular, there are a plurality of UEs 102 (only one shown and described for simplicity of explanation), an intermediate network element (INE) 104, and a plurality of servers 106. The INE 104 is used to intercept messages in the communications network 100 sent between the UE 102 and the servers 106 and can be used to selectively control and modify such messaging. For example, the servers 106 may host content such as web pages and media files and the UE 102 may signal one or more of the servers 106 so as to retrieve such content. The INE 104 may intercept, modify and control the content before it is passed onto the UE 102. Therefore, the UE 102 is in communication with the INE 104, which in turn is in communication with each of the plurality of servers 106. The INE 104 is capable of communicating with the plurality of servers 106 via the internet 108. Although in this figure, the INE 104 is shown to be placed between the UE 102 and the internet 108, it will be understood that this is for ease of illustration only and that the INE 104 can be placed at any point in the communications network so that it is capable of intercepting communications between the UE 102 and the servers 106. The UE 102 is capable of communicating with the INE 104 via the internet 108 or via some other communications network.

Figure 2:
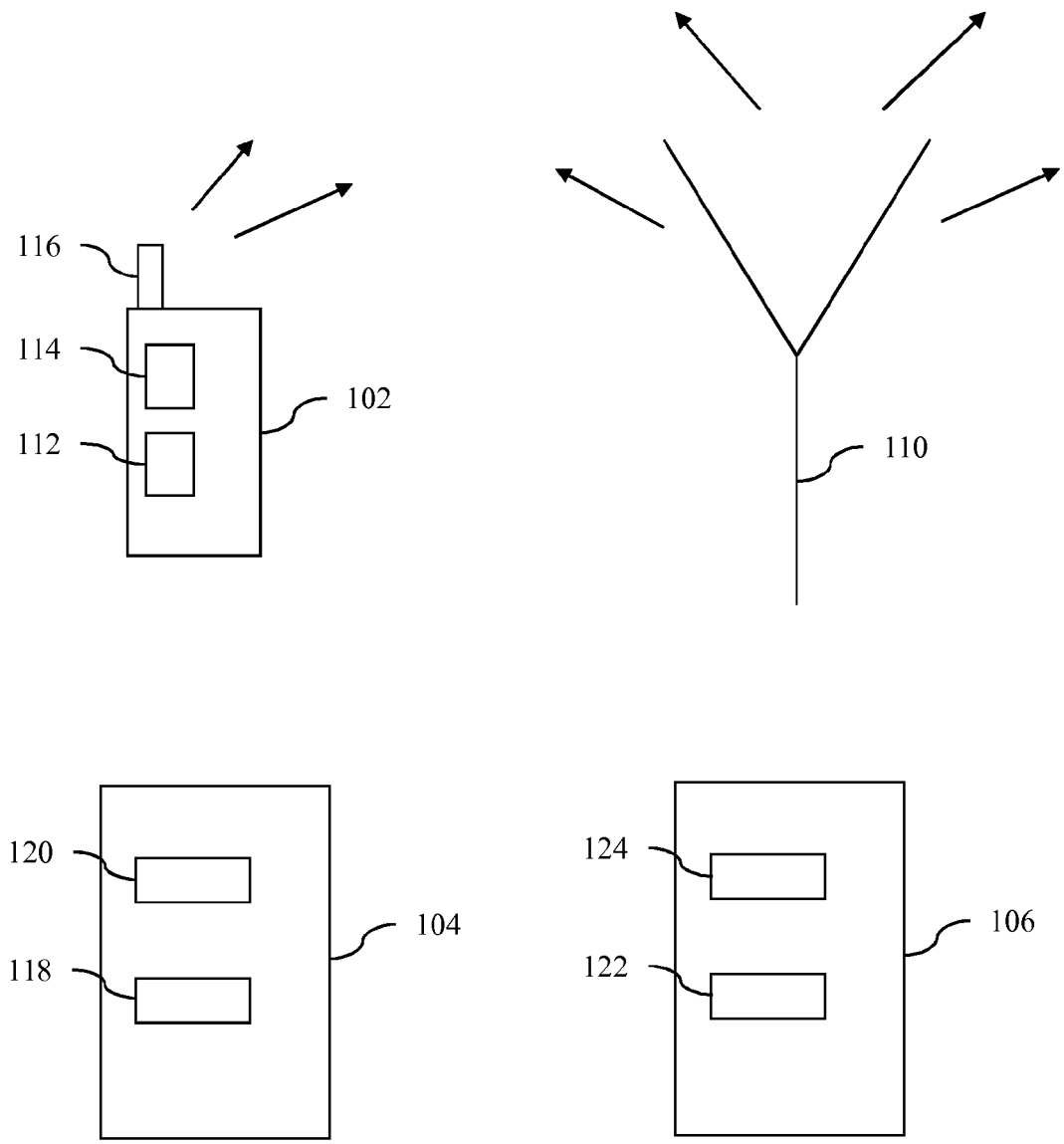
FIG. 2 is a schematic block diagram showing network elements present in the communications network of FIG. 1 in further detail.

FIG. 2 shows schematically a UE 102 such as a mobile phone, an INE 104, a server 106 and a network control apparatus 110 for use in the communications network 100 of FIG. 1. The UE 102 contains the necessary radio module 112, processor(s) and memory/memories 114, antenna 116, etc. to enable wireless communication with the network. The UE 102 in use is in communication with a radio mast associated with the network control apparatus 110. As a particular example in the context of UMTS (Universal Mobile Telecommunications System), there may be a network control apparatus 110 (which may be constituted by for example a so-called Radio Network Controller) operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. The network control apparatus 110 (of whatever type) may have its own radio module, processor(s) and memory/memories, etc. Similarly, the INE 104 may have its own radio module 118, processor(s) and memory/memories 120, etc. Similarly, each of the plurality of servers 106 may have their own radio module 122, processor(s) and memory/memories 124, etc.

The INE 104 is a device, network node or module that can be co-located or integrated with existing network architecture. As such, in some examples, the INE 104 may form part of a cellular network. In one example, it may be a stand-alone device, such as a proxy server. The INE 104 is said to be "intermediate" because it is placed in the communications network between the UE 102 and other network elements such as the origin server 106-1, and one or more other servers 106-2, 106-3 which may be associated with third party content providers (i.e. third party in the respect that they are different from an operator associated with the INE 104). The INE 104 is used to intercept signaling or messages from the UE 102 and to determine whether or not any control, modification or optimization of content is desirable before being provided to the UE 102. For example, the INE 102 can be used to add data to the messages, determine access rights for the UE 102 to allow access to the content of the messages, or optimize or compress the messages. For example, the content may be Hypertext Markup Language (HTML) content or media content such as audio, video, text and/or images. The INE 104 comprises a processing system and memory containing computer readable instructions which are executed by the processing system for the INE, or any of its components or modules, to perform their functions. The INE 104 also comprises suitable communications interfaces for communicating with other entities in the network.

Figure 3:
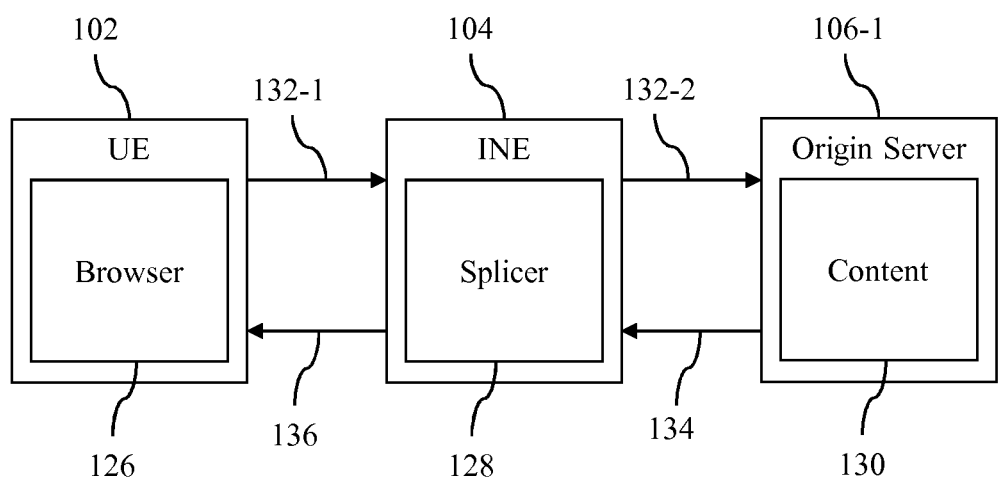
FIG. 3 is a schematic block diagram showing an example of signaling in the communications network of FIG. 1.

FIG. 3 shows a schematic block diagram of an example of the system architecture of FIG. 1 in further detail. There is provided a UE 102 having a user agent, in this example a web browser 126, an INE 104 having a splicer module 128 and an origin server 106-1 having content 130. The INE 104 is located in a communication path between the UE 102 and the origin server 106-1. In this example, the INE 104 is arranged to intercept all communications between the UE 102 and the origin server 106.

The splicer module 128 of the INE 104 is used to selectively modify messages from the origin server 106-1 for sending to the UE 102. The origin server 106-1 generally contains data and content populated by an operator of the origin server 106-1 and as such may contain a database (not shown) to store such content.

In the operation of one example, when a user of the UE 102 wishes to view a web page in the browser 126, the user may cause the browser 126 to compile and send a request message, such as a Hypertext Transfer Protocol (HTTP) request 132-1, towards a server that hosts the web page, which in this case is the origin server 106-1. The request 132-1 may be triggered in response to various events, such as in response to the user entering a Uniform Resource Locator (URL) in an input field of the browser 126, or in response to the user selecting a hyperlink, which initially loads the browser 126 and automatically sends the request 132-1 so as to fetch the web page.

The INE 104 intercepts or receives the request 132-1 and analyzes it to determine the destination of the request 132-1, which in this case is the origin server 106-1. The request 132-1, in this example, is accordingly forwarded to the origin server 106-1 in its original format as a HTTP request 132-2. Based on the received HTTP request 132-2, the origin server 106-1 sends a HTTP response 134 destined for the UE 102. The response 134 contains at least a portion of the requested content, such as the requested web page.

The INE 104 intercepts the HTTP response 134 and uses splicer module 128 to decide whether or not any modification of the response 134 is desirable so as to control how the browser 126 of the UE 102 can handle the response. The splicer module 128 may determine based on one or more factors (or combination of factors) that a response is a candidate for modification. Non limiting examples of such factors include (1) that the HTTP Response message has a content-type of "text/html" or one of its variants; (2) that the user of the UE 102 has 'subscribed' to a service that the splicing facilitates; (3) that the UE 102 supports a particular type of content that is to be spliced into the response.

In one example, the splicer module 128 may determine that the UE 102 supports Javascript, so that the content of the response is to have some Javascript (or a link thereto) spliced into it. For example, the Javascript when executed within the user's browser 126 may cause a 'floating toolbar' to be displayed with which the user may interact. This toolbar is defined to be "floating" such that, when a web page is displayed in the user's browser and the toolbar is displayed, the user can scroll on a web page without the toolbar changing its position relative to the browser frame. The toolbar may have a plurality of user selectable icons for triggering further dedicated JavaScript applications, such as applications for retrieving weather information or for retrieving information about the stock markets, and so forth.

Any such response, whether modified or not, is then forwarded to the UE 102 as a HTTP response 136 for execution by the browser 126 of the UE 102.

If the splicer module 128 determines that data is to be added to the response 134, it then adds to or "splices" data with the HTTP response 134 so as to create a modified HTTP response 136. The splicer module 128 may also determine whether or not such data is to be compressed before being spliced with the HTTP response 134. Such compression may be the same as the content-encoding of the content with which the data is being spliced.

The UE 102 receives the modified HTTP response 136 and the browser 126 then executes the response to display the web page. Although specific examples herein are based on the interception of a HTTP response, it will be understood that the addition of data could occur at a source of the data transmittal, such as at a content provider. In such a case, no interception of a message at an INE 104 is required, but instead, the content provider may dynamically add data to existing content in the general manner described herein. As such, the data container having the content-encoding need not be comprised within a HTTP response but may instead be a stand-alone data container or may be comprised within another form of message.

Figure 4:
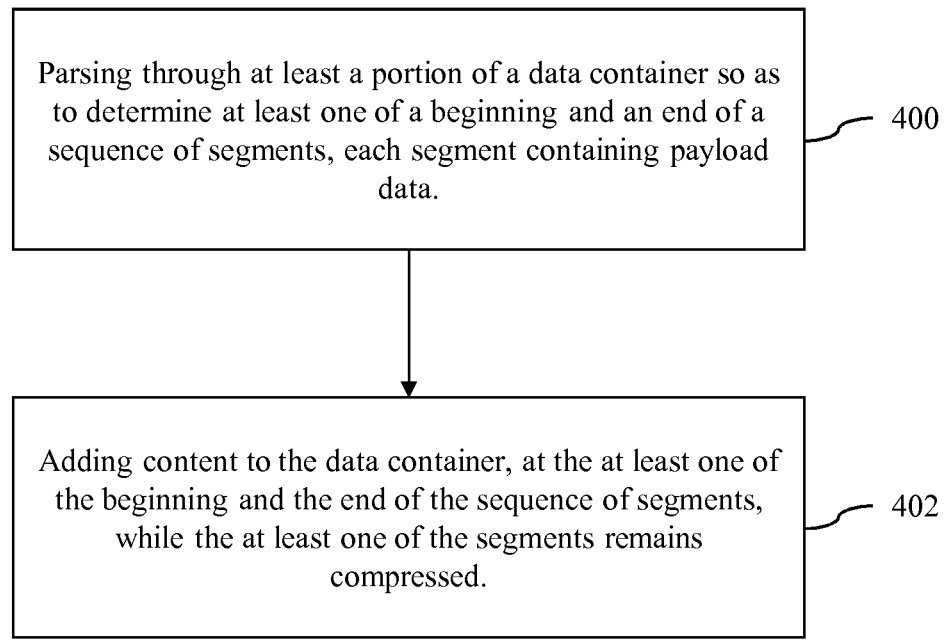
FIG. 4 is a schematic state flow diagram showing processes that occur in a first example of a method according to one or more disclosed embodiments.

FIG. 4 shows a schematic state flow diagram of processes that occur in a first example of a method. The method may be used for adding data to a data container, where the data container may comprise a plurality of segments arranged in a sequence. Each segment contains payload data, and at least one of the segments is compressed. The method, for example, may be used by the INE 104 for modifying communications in a communications network 100, such as the IMS network shown in FIG. 1.

At step 400, at least a portion of a data container is parsed so as to determine at least one of a beginning and an end of the sequence of segments. For example, the data container may be a known content-encoding or format, such as gzip or deflate of content contained within an HTTP response 134. As such, the data container may be parsed or traversed by the INE 104 so as to determine the points at which the sequence of segments starts and/or ends.

At step 402, the content is added or "spliced" into the data container so as to effectively augment the payload data contained in the data container. This is done in a manner such that the payload data does not need fully decompressing in order to add the content. Therefore, the content is added while at least one of the segments remains compressed. As discussed by example in relation to FIG. 3, the data container may be comprised within a HTTP response 134 and may contain web page data for execution by the UE 102. The content to be added to the data container may be a floating toolbar that is to be superimposed on the web page when executed by the browser 126 of UE 102.

Figure 5:
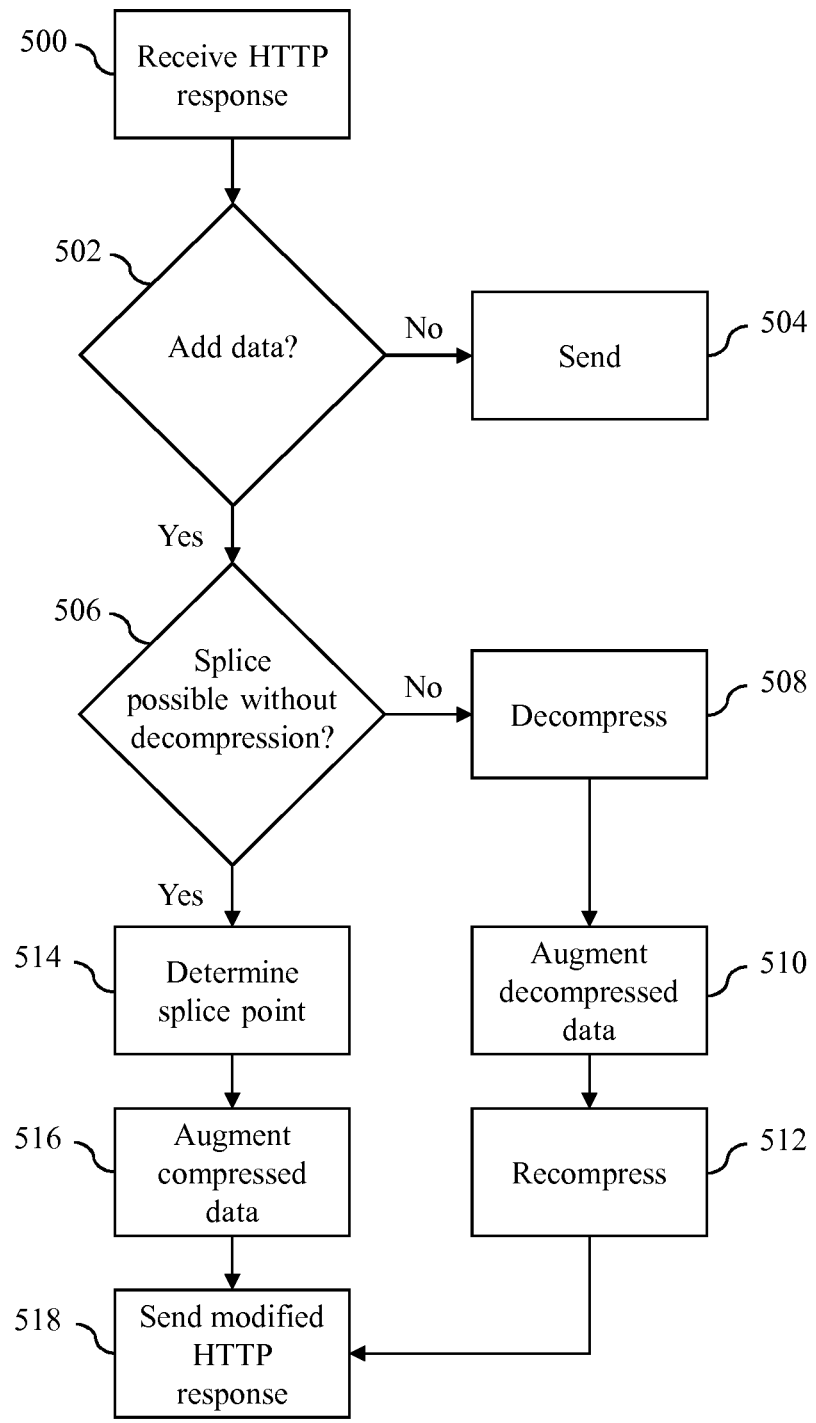
FIG. 5 is a schematic block diagram showing a process for modifying a HTTP response in a second example of a method according to one or more disclosed embodiments.

FIG. 5 is a schematic block diagram showing the modification of a received HTTP response 134 at the INE 104 in more detail.

At step 500, the HTTP response 134 is received by the INE 104 from the origin server 106-1. The HTTP response 134 may comprise a header indicative of the content of the response and a payload comprised within a data container. In this example, the payload is the compressed web page data for execution by the browser 126 of the UE 104. This HTTP response 134 is based on a HTTP request 132 received by the INE 104 from the UE 102, which was subsequently forwarded to the origin server 106-1.

At step 502, the splicer module 128 of the INE 104 first determines whether or not data needs adding to the HTTP response 134. For example, the INE 104 determines whether a floating toolbar requires adding to a web page. If no such data requires adding to the HTTP response 134, then the process moves on to step 504, at which point the HTTP response 134 is forwarded to the UE 102 without any modification. If, at step 502, it is determined that data is to be added to the HTTP response 134, then the process moves on to step 506.

At step 506, the splicer module 128 determines whether or not a splicing operation is possible without first decompressing the data container of the HTTP response 134 to which a content-encoding is applied. In particular, the splicer module 128 attempts to identify a content-encoding of the data container to determine if the content-encoding is known. If the content-encoding (e.g. gzip, deflate, bzip2, snappy, etc.) is known, the splicer determines whether the file format of the content-encoding can be traversed so as to determine whether data can be spliced with the data container without first decompressing the data container.

If at step 506 the splicer determines that it is not possible to splice data with the data container without first decompressing the data, then the process moves onto step 508 where the data container is decompressed. The decompression involves removing the content-encoding from the data container. The desired data that is to be added to the data container is then added to the decompressed data container at step 510 so as to augment the decompressed payload data of the data container. The augmented decompressed payload data is then recompressed with the original content-encoding scheme (or possibly a different content-encoding scheme, if that would result in less bytes) at step 512, before moving onto step 518, where the recompressed data container is incorporated into a modified HTTP response 136, which is then sent to the UE 102.

If at step 506 the splicer module 128 determines that a splicing operation is possible (i.e. without full decompression of the data container being required) then the process moves on to step 514 where an appropriate "splice point" is determined, at which point the data is to be added. The determination of the splice point is based on the type of operation being required for the adding of the data, and more particularly, if the operation is a prepend operation or an append operation. In a prepend operation, the data is to be added to precede the compressed payload. In an append operation, the data is to be added to follow the compressed payload. In both cases, the added data is to be concatenated with the compressed payload so as to augment the compressed payload. The splice point is determined by traversing the data structure of the data container as discussed in more detail with respect to FIG. 6.

After having determined the splice point at step 514, the process then moves on to step 516, whereby the data is added to the data container so as to augment the compressed payload. As discussed in more detail with respect to FIG. 6, the addition of the data means that a cyclic redundancy check (CRC) or other type of checksum will need recalculating before the data container is then incorporated into a HTTP response 136 (i.e. the modified HTTP response 136).

Then, at step 518, the modified HTTP response 136 (i.e. original HTTP response 134 plus the additional data) is sent to UE 102. In the case where the original compressed payload is a web page and the additional data is a floating toolbar, the browser 126 of the UE 102 will execute the modified HTTP response 136 so as to display both the web page as well as the floating toolbar.

Figure 6:
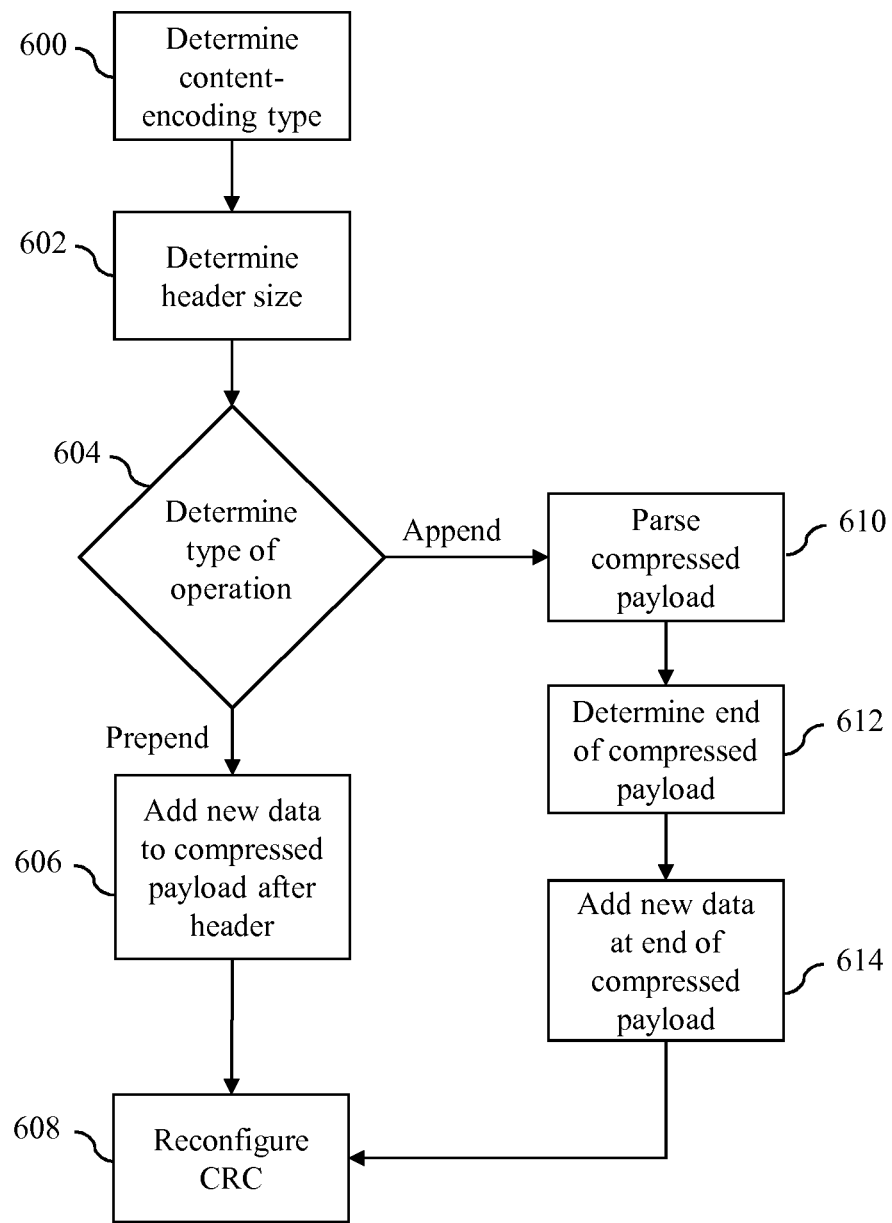
FIG. 6 is a schematic block diagram showing a process for modifying a HTTP response in a third example of a method according to one or more disclosed embodiments.

FIG. 6 is a schematic block diagram showing the splicing operation of FIG. 5 in more detail. In this figure, it is assumed that the received HTTP response 134 has a predetermined content-encoding applied to its content or payload and that the content-encoding is recognised by the INE 104 as being one whose structure can be traversed without first being fully decompressed. In particular, the structure of a message having a known content-encoding can be predicted based on that content-encoding type.

At step 600, the splicer module 128 of the INE 104 receives the HTTP response 136 and parses the response so as to glean information from the HTTP response 136. In particular, the splicer module 128 parses the HTTP response 134 to obtain header information associated with the HTTP response 134, which header information is typically contained within the initial bytes of the HTTP response 134. The gleaned header information is read by the splicer module 128 and the splicer module 128 uses this information to identify the content-encoding type of the data container (which contains the payload of the HTTP response 134).

The splicer module 128 has pre-stored information regarding the layout of various content-encoding types and identifies the content-encoding type as one which is known. Knowing the content-encoding type allows the splicer module 128 to interpret the bytes and bits of the data container. Moreover, as certain content-encoding types are standardised, the splicer module 128 can predict the layout of the data container in order to quickly establish the relevant splice point or points. By determining the content-encoding, the splicer module 128 can establish whether the data container is one which can be properly traversed so as to correctly determine the splice points. The splicer module 128 may also perform various other checks such as checking the HTTP response code to confirm that the response is a successful response to a request made by the UE 102 (i.e. and therefore has a status code of "200"), checking whether the content type of the additional data is compatible with the content type of the data container, checking if the data container has a character set compatible with the additional data, checking if the UE 102 can support the type of additional data to be added (e.g. JavaScript), and checking whether or not the additional data should be compressed.

At step 602, the splicer module 128 determines the header size of the data container. The header size typically comprises a fixed number of bytes according to what has been standardised for that type of header, followed by optional header bytes. The header itself indicates which optional headers are present in the data container and hence the number of bytes in excess of the fixed number dictated by the relevant standard.

After having determined the header size at step 602, the process then moves onto step 604 where the splicer module 128 determines the type of operation desired. In particular, the splicer module 128 determines if either a prepend operation or an append operation is required. This determination may be based on one or more factors, for example, the nature of the user agent 126. For example, if the user agent 126 is of a type known to accept appended content, it is determined to perform an append operation. Alternatively, if the user agent 126 is of a type known to accept prepended content, it is determined to perform a prepend operation.

If at step 604, it is determined that a prepend operation has been requested, the process moves on to step 606 where the new data is added to the data container of the HTTP response 134 at a point that immediately follows the data container header and which precedes the compressed payload. The new data is added in such a manner that it is concatenated with the compressed payload and augments the compressed payload. The new data may optionally be compressed to match the compression of the compressed payload before it is added to the data container. The process then moves onto step 608 where a cyclic redundancy check (CRC) or other checksum is recalculated before the updated data container is incorporated into a modified HTTP response 136, which may then be sent to the UE 102.

If at step 604, it is determined that an append operation has been requested, the process moves on to step 610 where the splicing module 128 continues to parse the data of the data container that follows the determined header. This data that follows the header is the compressed payload.

The parsing of the compressed payload continues until step 612 where the end of the compressed payload is reached. This is typically flagged by the data itself, and therefore the splicing module 128 can be readily made aware of the end of the compressed payload as a consequence of having determined the content-encoding type.

After the end of the compressed payload has been identified, the process moves onto step 614, at which point the new data is added so that it immediately follows the compressed payload and precedes any trailer data in the data container. The new data is added in such a manner that it is concatenated with the compressed payload and augments the compressed payload. The process then moves onto step 608 where the cyclic redundancy check (CRC) or other checksum (e.g. Adler-32, Fletcher checksum, etc.) is recalculated before the updated data contained is incorporated into a modified HTTP response 136, which may then be sent to the UE 102.

The checksums are used as error-detection mechanisms that are ideally recalculated or recomputed to account for the modification of the HTTP response 134, otherwise the user agent 126 might infer an error in the data and consequently reject the modified HTTP response 136.

Some specific examples will now be described with respect to FIGS. 7 to 10 however it will be understood that these examples are not limiting and that the methods described herein will extend to any content-encoding type whose data structure can be traversed.

Figure 7:
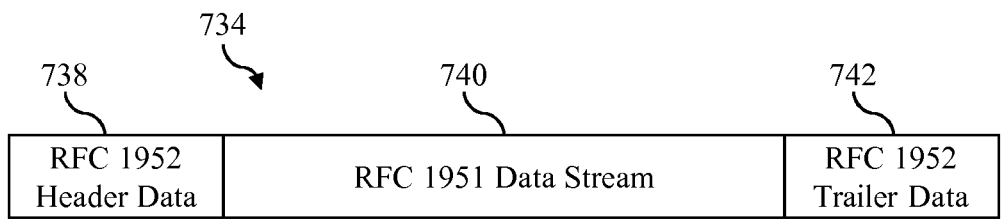
FIG. 7 is a schematic block diagram showing an example gzip file format for a data container according to one or more disclosed embodiments.
Figure 8:
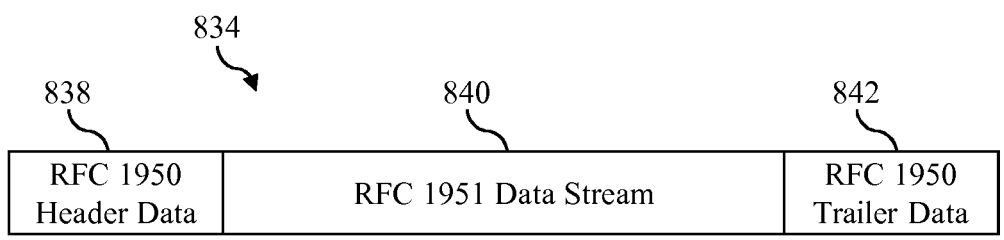
FIG. 8 is a schematic block diagram showing an example deflate file format for a data container according to one or more disclosed embodiments.

FIGS. 7 and 8 are schematic block diagrams of data containers that are encoded with similar type content-encodings and which are contained in the HTTP response 134 (See FIG. 3). The data container 734 of FIG. 7 is in accordance with RFC 1952 and embeds a data stream 740 that is in accordance with RFC 1951. The content encoding for the data container 734 is therefore "gzip". The data container 834 of FIG. 8 is in accordance with RFC 1950 and embeds a data stream 840 that is in accordance with RFC 1951. The content encoding for the data container 834 is therefore "deflate". Both gzip and deflate make use of the well-known Huffman coding to compress their data streams. In Huffman coding, each character (or symbol) in a set of characters (or symbols) is encoded with a Huffman code (or pre-fix) unique to that character (or symbol). Smaller codes are used to encode the characters (or symbols) that are likely to have higher probability of occurrence in a data set. A so called Huffman tree defines which Huffman code represents which symbol (or character) in a given coding scheme.

In more detail and as shown in FIG. 7, the data container 734 comprises RFC 1952 header data 738, a RFC 1951 data stream 740 (i.e. the compressed payload) and RFC 1952 trailer data 742. The content-encoding type (i.e. which, in this case, is gzip) is indicated by a content-encoding header in the HTTP response 134. In this manner the INE 104 may discern whether or not the content-encoding is of a type that the INE 104 can traverse without needing to decompress the data container 734. In this case, the splicer module 128 recognises the container type as being gzip as indicated by the content-encoding header and identifies this content-encoding as one whose data structure can be traversed.

In this example of a gzip file format, the header data 738 has a fixed 10-byte header field and, optionally, extra header fields. The header data 738 at least comprises a so called 'magic number' (i.e. which identifies the file format as gzip), a version number and a timestamp.

The data stream 740 comprises compressed payload data and the trailer 742 comprises a CRC-32 checksum and information regarding the length of the original uncompressed payload data.

Figure 9:
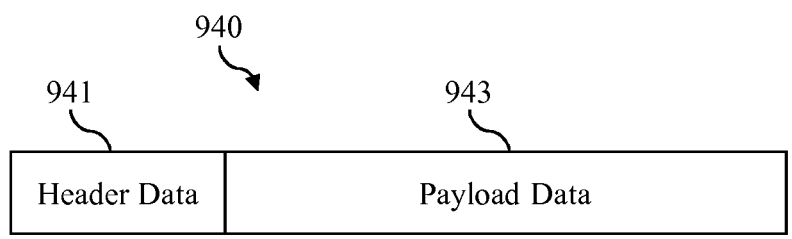
FIG. 9 is a schematic block diagram showing an example data block for a data container according to one or more disclosed embodiments.
Figure 10:
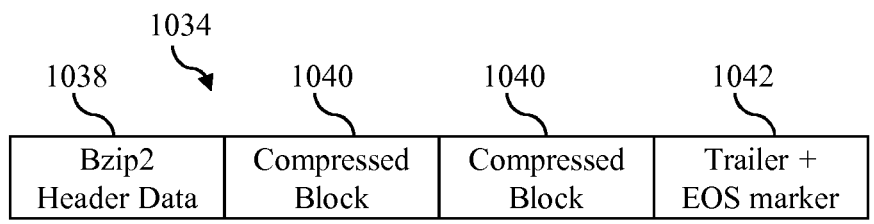
FIG. 10 is a schematic state flow diagram showing an example bzip2 file format for a data container according to one or more disclosed embodiments.

As illustrated in FIG. 9, the compressed payload 740 is a bit stream that comprises a series of segments 940 known as blocks (of which, for simplicity, only one is illustrated in FIG. 9). Each block 940 of the bit stream comprises a 3-bit header 941 followed by compressed payload data 943. The payload data 943 may be content for execution by the browser 126 of the UE 102. The first of the 3 bits of a header 941 is the "last-block-in-stream" marker, which, if the block is the last block in the bitstream, is set to "1" and otherwise (i.e. if the block is not the last block in the bitstream) is set to "0".

As defined in RFC 1951, the next two bits of a header 941 designate the encoding method used for the block (i.e. the block type). A value of "00" (Type 0) indicates that the data that follows the header is raw data (i.e. uncompressed) between 0 and 65,535 bytes in length. A value of "01" (Type 1) indicates that the block is a static Huffman compressed block, which has data compressed in accordance with a pre-defined Huffman tree as defined in RFC 1951 itself. A value of "10" (Type 2) indicates that the block is a block that has data compressed in accordance with a dynamic Huffman tree which is itself provided in the block.

In the case of a prepend operation, the HTTP response 134 comprising the data container 734 in the gzip file format is received at the INE 104 and the splicer module 128 identifies that the content-encoding is gzip. Once the content-encoding has been identified, the splicer module 128 is aware of the general format of the gzip data container 734. The splicer module 128 then determines the length of the header 738. This is done by parsing the header 738 to determine if any optional extra header fields are present and thereby determining whether the header 738 is equal to or greater than the fixed 10-bytes.

The header data 738 indicates whether optional extra headers are present using one or more flags. For example, if the bit relating to "FLG.FEXTRA" is set in the 10 byte fixed header, the 2-byte field "XLEN" will be included in the header, which will then be followed by "XLEN" bytes. If the bit relating to "FLG.FNAME" is set in the 10 byte fixed header, a field consisting of a series of bytes terminated by a null or zero byte will be included in the header. Similarly, if the bit relating to "FLG.FCOMMENT" is set in the 10 byte fixed header, a field consisting of a series of bytes terminated by a null or zero byte will be included in the header. If the bit relating to "FLG.FHCRC" is set in the 10 byte fixed header, a 2 byte field is included in the header. Therefore, specific bits in the 10 byte fixed header act as flags, which are used to indicate the presence of one or more optional extra header fields. The optional extra header fields themselves are indicative of their own size. Where FLG.FNAME and FLG.FCOMMENT are used, the splicer module 128 must continue parsing the header until the null byte is found in order to establish the end of that optional extra header, and hence its size.

Once the splicer module 128 has determined the end of the header data 738 it can then add the new data into the data container 734 at that point. The new data will precede the compressed payload 740 and hence the new data is said to pre-pend the compressed payload 740. The splicer module 128 writes the data as an RFC 1951 data block (either uncompressed (Type 0) or compressed (Type 1 or 2), depending on what the splicer module 128 decides) before it is prepended to the compressed payload.

In an append operation, the splicer module 128 first, as described above, establishes the end of the header data 738, and then parses the payload bitstream 740 to establish its end. As the splicer module 128 is aware that the data container 734 is in the gzip format, it is aware that the compressed bitstream is in accordance with RFC1951 and so therefore can readily identify the layout of the bitstream.

For each block that is of 'Type 0', the splicer module 128 parses the first three block header bits to identify whether the block is the last block in the datastream and to identify the block type. Then, the splicer module 128 parses the next two bytes which indicate the length of the block and, based on that identified block length, skips over the remainder of that block so that the end of that block is reached.

For each block that is of 'Type 1', again, the splicer module 128 parses the first three block header bits to identify whether the block is the last block in the datastream and to identify the block type. Then, the splicer module 128 parses the remainder of the block using the pre-defined Huffman tree to identify each consecutive Huffman code (sometimes known as a pre-fix) that encodes a character (or symbol) in the block. In accordance with RFC 1951, a specific symbol, 'value 256', is always used to indicate the end of a block (i.e. it's always the last symbol in a block). Accordingly, once the splicer module 128 has identified the specific Huffman code that encodes the end of block symbol, it knows that the end of the block has been reached. The pre-defined Huffman code tree for 'Type 1' blocks may be pre-stored in a memory (not shown) from where it is retrieved by the splicer module 128 for use in parsing a 'Type 1' block.

For each block that is of 'Type 2' again, the splicer module 128 parses the first three block header bits to identify whether the block is the last block in the data stream and to identify the block type. The splicer module 128 then continues parsing until the dynamic Huffman tree for that block has been decoded in accordance with RFC 1951. The splicer module 128 then parses through the remainder of the block using that dynamic Huffman tree to identify each consecutive Huffman code in the block, until as with 'Type 1' blocks, the code encoding the 'end of block' symbol is identified.

It will be appreciated that for 'Type 1' and 'Type 2' blocks, the value of each Huffman code, in other words, what character or symbol that code maps to or what copy command it maps to, does not need to be stored. In other words, the splicer module 128 simply parses but does not un-compress the block.

The splicer module 128 parses through the blocks in this way until the last block in the bitstream is found, as indicated by the first bit of the header of the last block being "1". The first bit of the header of this last block is then changed from "1" to "0" so that it no longer indicates that it is the last block in the sequence (i.e. because the splicer module 128 is about to add new data). The splicer module 128 then continues to traverse the last block so as to find the end of this block, and hence the end of the compressed bitstream. The splicer module 128 then creates a new block with the new data (either compressed or uncompressed) to be appended to the compressed bitstream and adds this to the determined end of the compressed bitstream.

After either of the prepend operation or the append operation has been performed, the CRC of the data container 734 is recomputed and the overall uncompressed length value is recalculated and then the trailer data 742 updated accordingly with these values.

In the case of an append operation, given the CRC of the original data, and as the uncompressed length of the appended data is known, then an updated CRC can readily be calculated following code definitions provided in RFC 1952.

In the case of a pre-pend operation an updated CRC can be calculated with, for example, the known crc32_combine technique, using a CRC calculated for the pre-pended data, the CRC of the original data and the uncompressed length of the original data as provided in the RFC 1952 trailer data.

In the case of a prepend operation it is necessary to identify the start of the trailer data 742 in order that it can be updated. The splicer module 128 can identify the start of the trailer data 742 in several ways. In one example, the splicer module 128 skips directly to the end of the HTTP message that contains the data container 740 and then moves back 8 Octets to the presumed start of the trailer data 742. This technique is very efficient, but assumes that the HTTP message contains a well-formed RFC 1952 container, with no excess trailing data beyond that of the RFC 1952 trailer data 742, which in some instances might not be the case. This technique therefore might not always correctly identify the start of the trailer data 742.

In another example, the splicer module 128 parses through the compressed data stream 740, in the manner described above for the append use case, until the end of the last block of the data stream 740 is identified. This method of updating the trailer data 742 is relatively slow but is safer in that the start of the trailer data 742 is always accurately identified.

In the example of FIG. 8, the data container 834 is in accordance with RFC 1950 and embeds a data stream in accordance with RFC 1951. The content encoding for the data container 834 is therefore "deflate". The data container 834 comprises RFC 1950 header data 838, a data stream 840 (i.e. the compressed payload) and RFC 1950 trailer data 842.

Similarly as described above with respect to the example of FIG. 7, the INE 104 identifies that the content encoding of the data container 834 is 'deflate' based on the HTTP content encoding header of the HTTP response 134. As such, the INE 104 may discern whether or not this content-encoding is of a type that the INE 104 can traverse without needing to decompress the HTTP response 834. In this case, the splicer module 128 recognises the container type as being deflate as indicated by the content-encoding header and identifies this content-encoding as one whose data structure can be traversed.

In this example of a 'deflate' file format, the header data 838 comprises a 2 byte header and optionally, a 4 byte "DICT" dictionary identifier. The header data 838 comprises information identifying the compression method used to compress the payload (i.e. the deflate compression method). The header data 838 also comprises various flags, which perform different operations, for example, indicating the presence of the "DICT" dictionary identifier. The data stream 840 comprises the compressed payload and the trailer data 842 comprises an Adler-32 checksum.

As with the example of FIG. 7, the payload of FIG. 8 comprises a bitstream having a series of blocks, one of which is illustrated in FIG. 9.

The splicer module 128 parses the first two bytes of the header data 838 and determines if any optional extra headers fields are present (and hence if the header data 838 is larger than the fixed 2-byte header size). The slicer module determines whether optional extra headers are present based on one or more flags in the first two bytes. For example, the second byte comprises 8 bits, of which the fifth bit acts as a flag, which when set, indicates that a 4-byte "DICT" dictionary identifier is present immediately after the second byte (i.e. after the 2 byte fixed header).

For example, the splicer module 128 may therefore determine that the length or size of the header data 838 is 2 bytes if no optional dictionary is used or 6 bytes if an optional dictionary is defined. Hence the splicer module 128 determines the end position of the header data 838 (i.e. and hence the beginning of the bit stream that follows the end of the header data).

The prepend operation and the append operation of this example operate in a similar manner to that described with respect to FIG. 7. Namely, for the prepend operation, the splicer module 128 determines the end of the header data 838 as described above and then adds the new data to the data container 834 so as to augment the compressed payload 840. For the append operation, the splicer module 128 parses the blocks of compressed payload 840 in the same manner as described with respect to FIG. 7 so as to determine the end of the compressed payload 840, and then adds the new data to augment the compressed payload 840.

After an append operation has been performed, the Adler-32 checksum of the data container 834 is recomputed. Again, as the checksum of the original data is known, and as the uncompressed length of the appended data is known, then an updated checksum can readily be calculated following code definitions provided in RFC 1950. However, for the RFC 1950 container, it should be noted that in the event of a pre-pend operation it is not possible to re-compute the Adler-32 checksum because the RFC 1950 container does not indicate the length of the uncompressed data in the payload, a value which is necessary to re-calculate the Adler-32 checksum following a pre-pend operation.

The above embodiments are to be understood as illustrative examples of the invention. Further embodiments of the invention are envisaged.

In a further example, the splicing module 128 parses and appends additional data to a compressed payload in a data container 1034 (see FIG. 10) that is in the bzip2 file format. The data container 1034 comprises a 4-byte header data 1038, one or more compressed segments or blocks 1040 (i.e. the compressed payload) and footer or trailer data 1042. The header data 1038 is byte aligned but the rest of the container, including the footer data 1042 is a bit stream.

Each compressed block 1040 comprises a 48 bit block start marker (0x314159265359), a 32 bit CRC of the uncompressed data in the block, and compressed payload data. The footer data 1042 follows on immediately the last compressed block and comprises a 48 bit end of stream sequence (0x177245385090), a 32 bit CRC for the uncompressed data in the complete stream, and padding to end of byte with 0 bits having an end-of-stream (EOS) marker 1042 and a 32-bit CRC.

In one example, the splicer module 128 performs an append operation in the following way. The splicer module 128 identifies the end of the container 1034 and then skips backwards 4 bytes to take account of the length of the 32 bit CRC. Next, the splicer module 128 parses backwards a bit at a time until the end of stream marker (0x177245385090) is found in the bitstream. Next, splicer module 128 appends the data to be added by writing the added data as a new bzip2 block commencing at the bit position where the end of stream marker started. The splicer module 128 then writes updated footer data 1042 comprising the end of stream marker (0x177245385090) and un-updated CRC for the whole stream. If necessary, the splicer module 128 fills the footer data 1042 to the next byte boundary with zero bits.

In this way, the new block becomes the last block in the container (i.e. between the previous last block and the end of stream marker).

The splicer module 128 may determine the updated CRC in the same way as described above for the append operation for gzip.

Figure 11A:
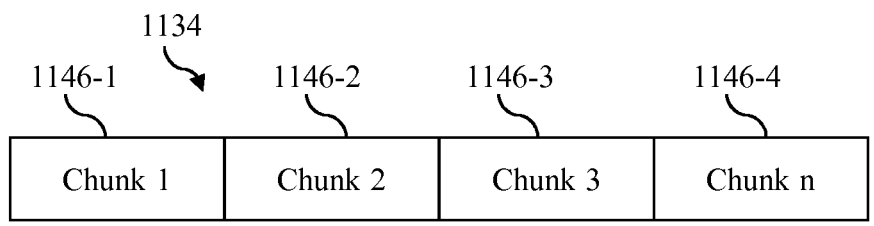
FIGS. 11a and 11b are schematic state flow diagrams showing an example snappy framing file format for a data container according to one or more disclosed embodiments.
Figure 11B:
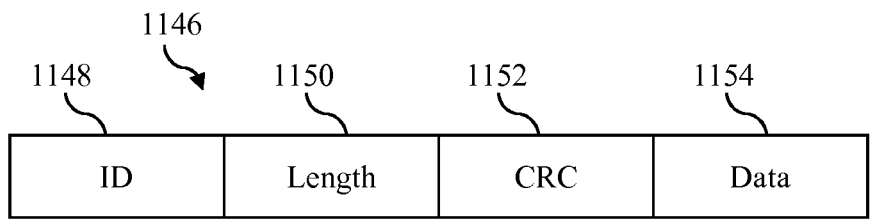

In the above described embodiments, the gzip, deflate and bzip2 file formats were discussed. However, it will be appreciated that the prepending and appending operations without full decompression can be possible with other file formats having a compressed payload. For example, the prepend and append operations can be performed with an HTTP response having a data container 1134 in the "snappy framing" file format which is illustrated in FIGS. 11*a* and 11*b*. Also, it will be appreciated that such file formats need not be HTTP compliant and therefore may be associated with any other signaling protocols.

The data container 1134 having the snappy framing format of content-encoding comprises a series of segments known as chunks 1146. At least one of the chunks 1146 stores compressed data but other chunks 1146 may store uncompressed data. There are three chunk types in the snappy framing format: a stream identifier chunk; a compressed data chunk; and an uncompressed data chunk.

The data container 1134 begins with a stream identifier chunk 1146-1, which has a fixed byte-size of 10 bytes. Each subsequent chunk 1146-2 to 1146-4 can be either a compressed data chunk or an un-compressed data chunk. A compressed data chunk or an un-compressed data chunk can thought of as independent compressed or uncompressed data stream, as the case may be.

As shown in FIG. 11*b*, a data chunk 1146 comprises a single byte chunk identifier 1148 followed by a 3-byte chunk length 1150 indicating the size of the chunk, an optional CRC 1152 and then the compressed or uncompressed data 1154.

In a prepend operation, the splicer module 128 parses from the start of the data container 1134 until the first compressed or uncompressed chunk 1146-2 is identified (i.e. which will be immediately after the stream identifier chunk 1146-1). The new data to be prepended is encoded into a snappy framing format data chunk and then added to precede the first data chunk 1146-2 (i.e. between the stream identifier chunk 1146-1 and the data chunk 1146-2).

In an append operation, the splicer module 128 skips to the end of the data container 1134 and the new data to be appended is encoded into a snappy framing format data chunk and then added to follow the last chunk 1146-4.

Although embodiments have been described as a INE such as a proxy server for intercepting HTTP messages, it will be understood that the INE may be a different type of server, for example, an email server for intercepting email messages having a predetermined content-encoding and that such email messages can be modified without decompression or with limited decompression (i.e. the entire email message need not be decompressed before data is added).

In the above described embodiment the additional data is appended or pre-pended to compressed data in a data container in a HTTP response message. In an alternative embodiment, the additional data is appended or pre-pended to compressed data in a data container in a HTTP push message.

In alternative embodiments, the splicer module 128 may parse through at least a portion of the data container to determine the end of the sequence of segments based on a determined size of each segment. The size may be a fixed pre-determined size pre-known by the slicer module 128 or determined by the splicer module from header information in the relevant data container.

In the above embodiments, the splicer module was described as being integrated with the INE. In alternative embodiments, the functions of the splicer module may be integrated with another network element such as a content provider. The content provider may thereby modify content before serving the content to a requesting entity.

In other alternative embodiments, there may be no intercepting of messages in a communication system. In one example, the functions of the splicer module may be integrated with a general purpose archiver application. Such archiver applications are typically used to backup files in a file system and in doing so compress the backed up data. When updating an existing archive, if an archiver application determines that a file has had data appended or prepended to it since a previous archiving operation, the archiver could function in the manner of the splicer module described above to efficiently append or prepend the new data to the archived version of the file.

It will be appreciated that the embodiments described herein are based on file formats that have structures that can be traversed. Errors in the compressed data stream that affect such traversal could therefore prevent a message from being modified. Therefore, in further embodiments, the splicer module is equipped with an error detection mechanism, which upon detecting an error in the compressed data stream or container format that is determined to deleteriously affect a traversal operation, can abort the modification process. In the case that the modification process is aborted, the INE is then caused to send the message, without modification, to its intended destination. If the error is found in a final block of a data stream, the splicer module may continue with the modification.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus for adding content to a data container, the apparatus comprising:
    at least one memory including computer program code;
    at least one processor in data communication with the memory, wherein the processor is configured to:
        parse through at least a portion of the data container, wherein the data container comprises one or more segments arranged in a sequence and a container trailer, wherein each segment contains payload data, and wherein at least one of the one or more segments is compressed and which container trailer follows the sequence of segments and comprises a marker indicative that an end of the sequence of segments has been reached, to determine an end of the sequence of segments and a beginning of the container trailer by parsing backwards through at least part of the container trailer to identify the marker; and
    add content to the data container between the marker and the end of the sequence of segments, while the at least one of the segments remains compressed.

2. The apparatus of claim 1, wherein the processor is further configured to parse the data container so as to determine a checksum for the data container and re-compute the checksum based on the added data.

3. The apparatus of claim 1, wherein the processor is further configured to:
    receive the data container in a message over a communication network prior to parsing the data container and adding the content to the data container; and
    forward the message over the communication network subsequent to parsing the data container and adding the content to the data container.

4. The apparatus of claim 3, wherein the message is a hypertext transfer protocol (HTTP) message.

5. A method for adding content to a data container, the method comprising:
  parsing through at least a portion of the data container, wherein the data container comprises one or more Segments arranged in a sequence and a container trailer, wherein each segment contains payload data, and wherein at least one of the one or more segments is compressed and which container trailer follows the sequence of segments and comprises a marker indicative that an end of the sequence of segments has been reached, so as to determine an end of the sequence of segments and a beginning of the container trailer by parsing backwards through at least part of the container trailer to identify the marker; and
  adding content to the data container between the marker and the end of the sequence of segments, while the at least one of the segments remains compressed.

6. The method of claim 5, the method comprising parsing the data container so as to determine a checksum for the data container and re-computing the checksum based on the added data.

7. The method of claim 5, the method comprising:
  receiving the data container in a message over a communication network prior to parsing the data container and adding the content to the data container; and
  forwarding the message over the communication network subsequent to parsing the data container and adding the content to the data container.

8. The method of claim 7, wherein the message is a hypertext transfer protocol (HTTP) message.

9. A non-transitory computer-readable storage medium having computer-executable instructions stored thereon, which, when executed by a processor cause a computing device to perform a method for adding content to a data container, the method comprising:
  parsing through at least a portion of the data container, wherein the data container comprises one or more segments arranged in a sequence and a container trailer, wherein each segment contains payload data, and wherein at least one of the one or more segments is compressed and which container trailer follows the sequence of segments and comprises a marker indicative that an end of the sequence of segments has been reached, so as to determine an end of the sequence of segments and a beginning of the container trailer by parsing backwards through at least part of the container trailer to identify the marker; and
  adding content to the data container between the marker and the end of the sequence of segments, while the at least one of the segments remains compressed.

10. The non-transitory computer readable storage medium of claim 9, wherein the method comprises parsing the data container so as to determine a checksum for the data container and re-computing the checksum based on the added data.

11. The non-transitory computer readable storage medium of claim 9, wherein the method comprises:
  receiving the data container in a message over a communication network prior to parsing the data container and adding the content to the data container; and
  forwarding the message over the communication network subsequent to parsing the data container and adding the content to the data container.

12. The non-transitory computer readable storage medium of claim 11, wherein the message is a hypertext transfer protocol (HTTP) message.

* * * * *